Figure 1:
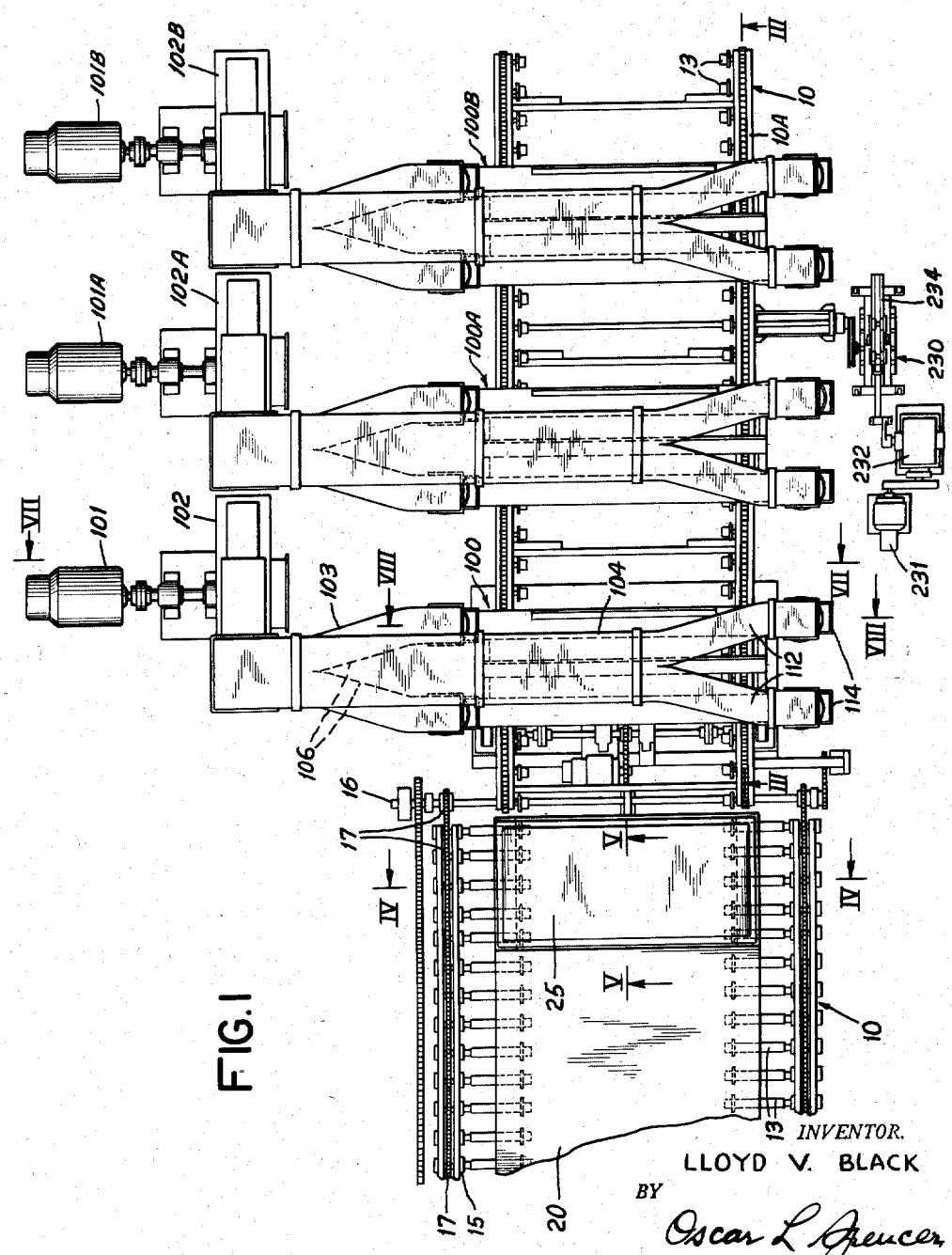

INVENTOR.
LLOYD V. BLACK
BY
Oscar L. Spencer
ATTORNEY.

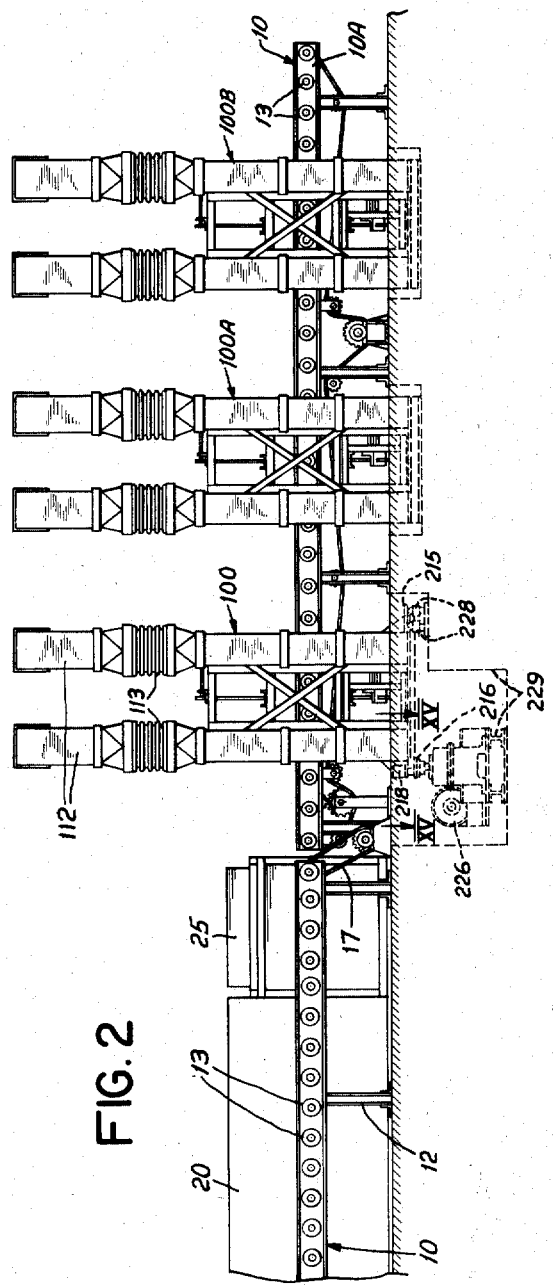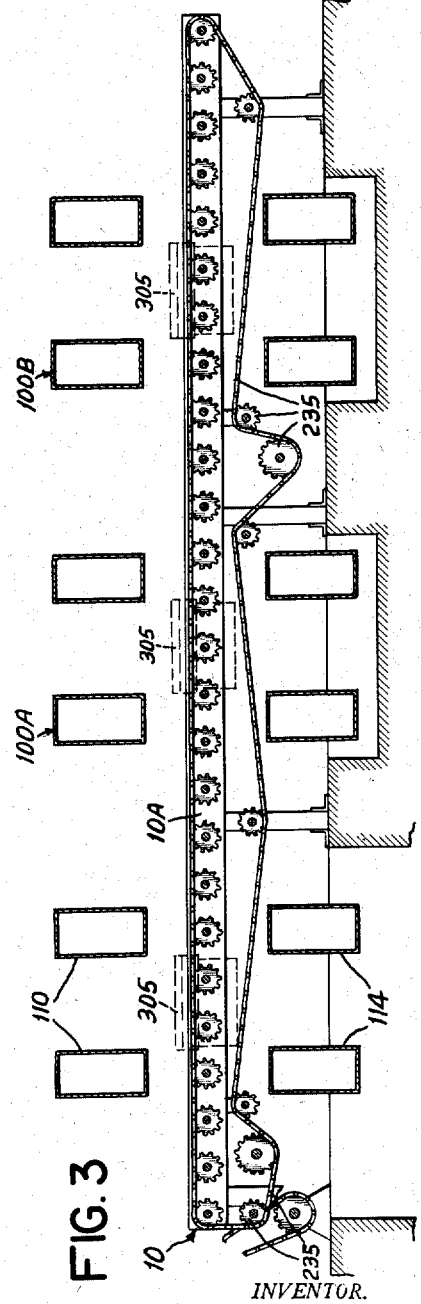

Jan. 19, 1960 — L. V. BLACK — 2,921,411
APPARATUS FOR THE AIR CHILLING OF BENT GLASS

INVENTOR.
LLOYD V. BLACK

INVENTOR.
LLOYD V. BLACK
BY
Oscar L. Spencer
ATTORNEY.

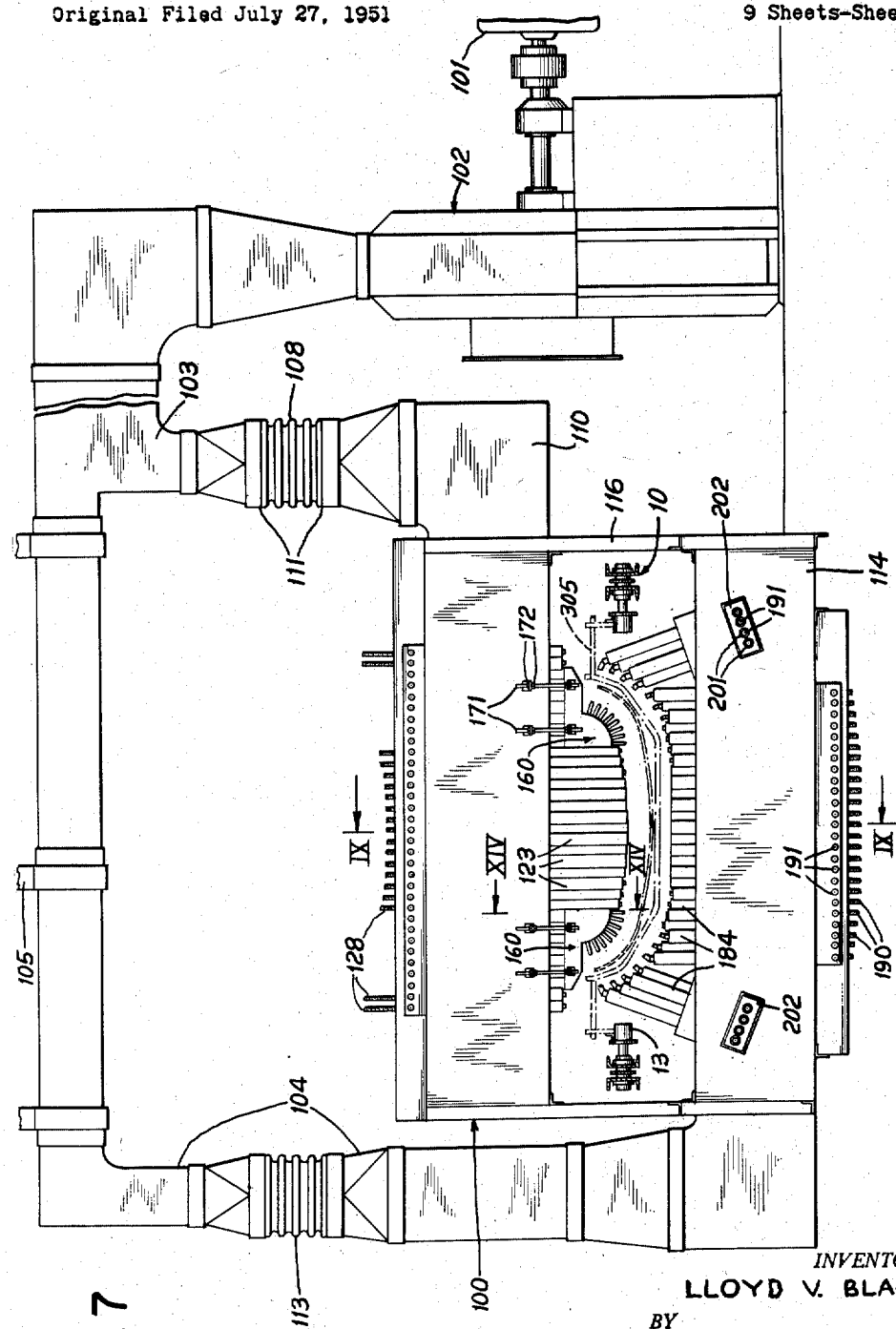

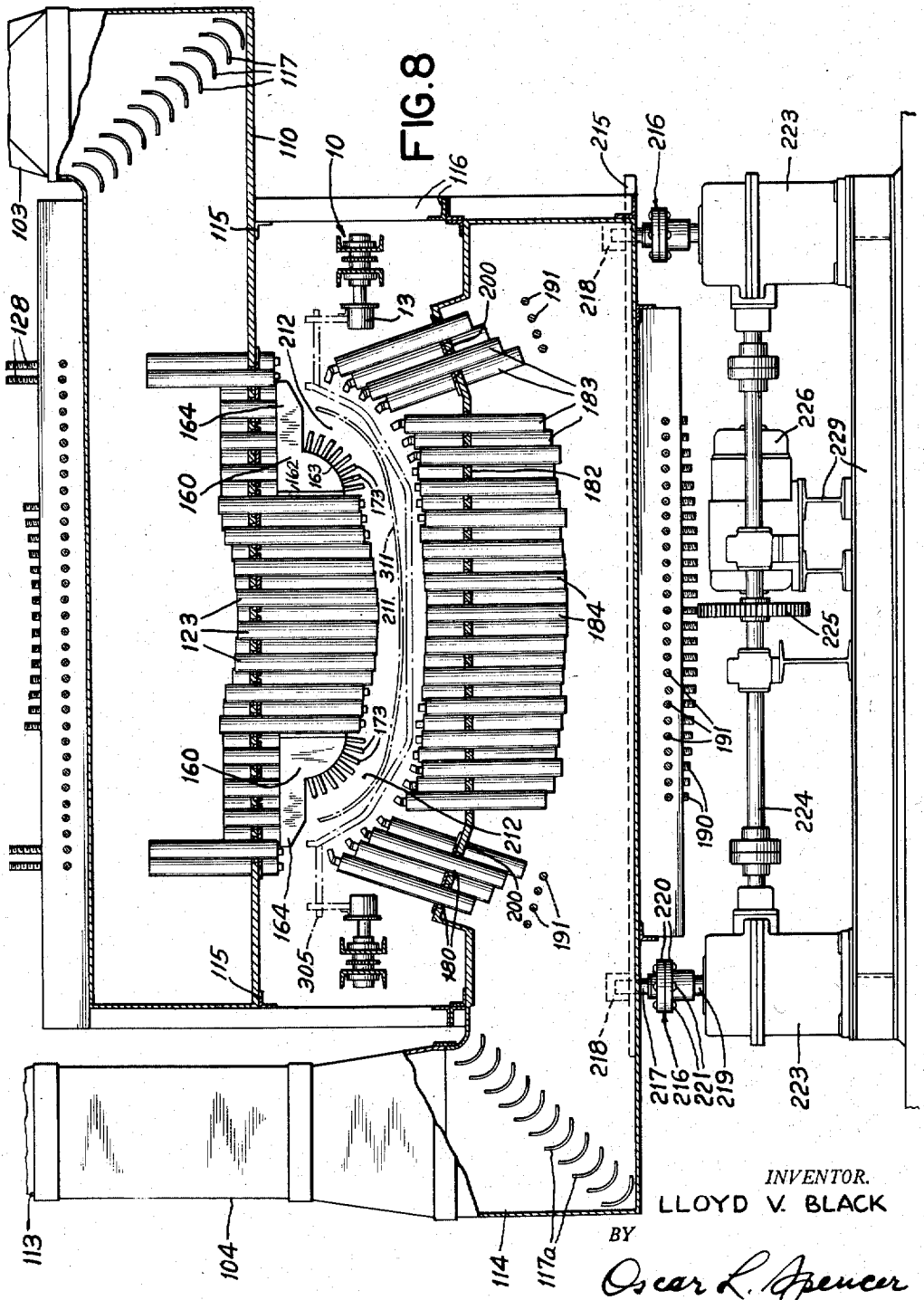

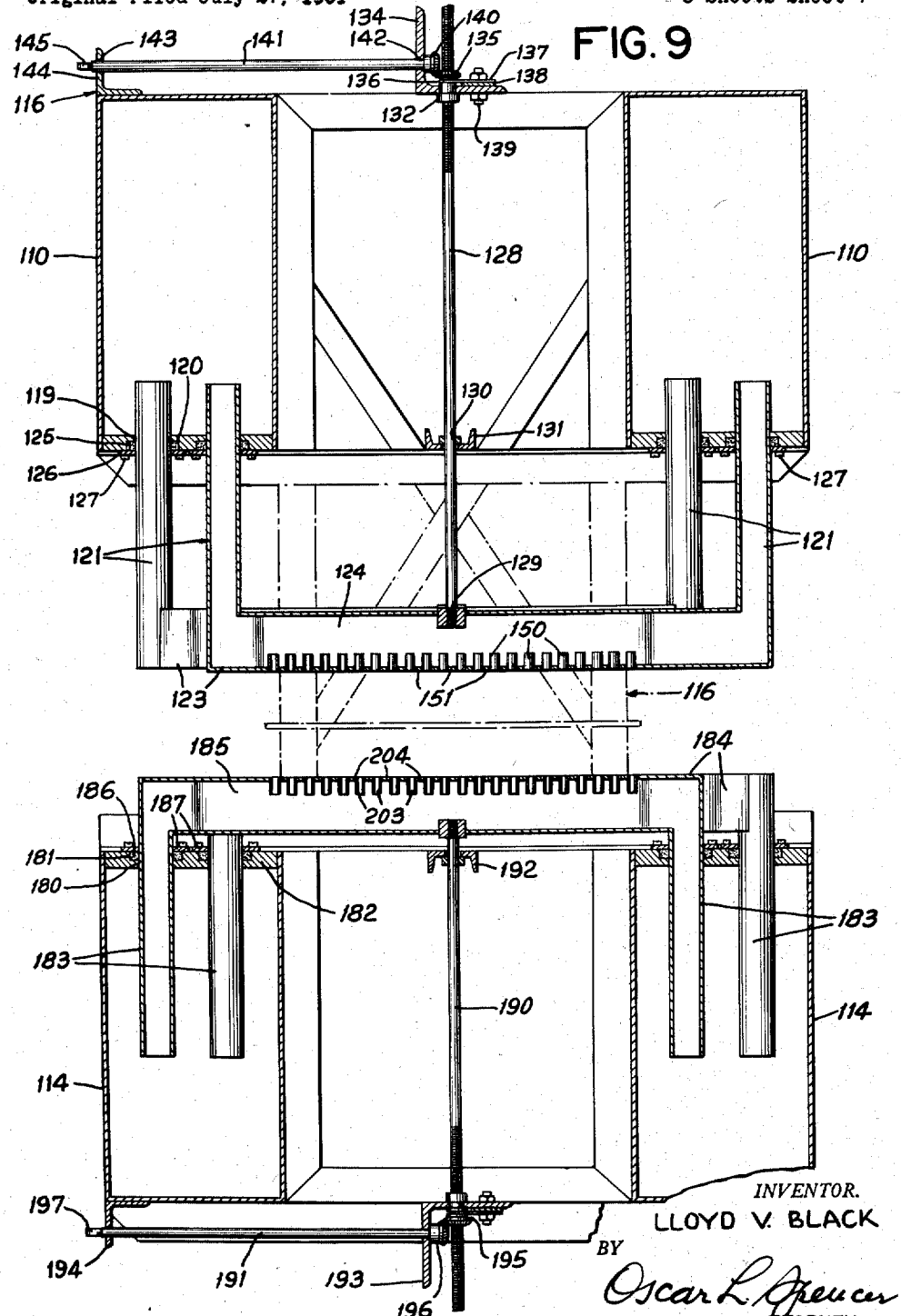

Jan. 19, 1960 L. V. BLACK 2,921,411
APPARATUS FOR THE AIR CHILLING OF BENT GLASS
Original Filed July 27, 1951 9 Sheets-Sheet 8
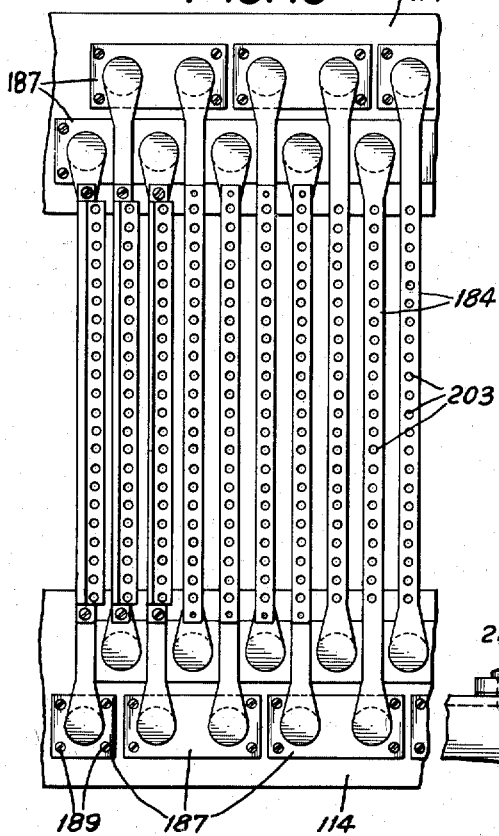
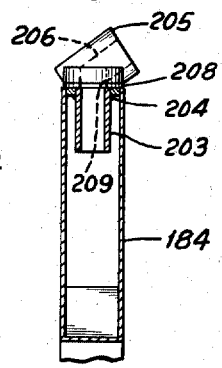
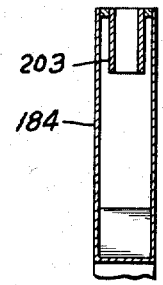
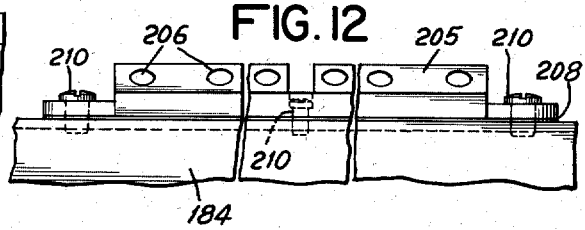
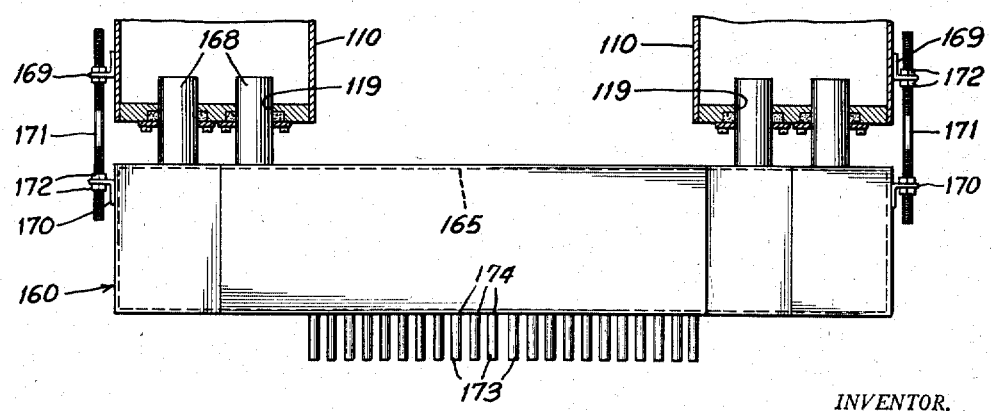
INVENTOR.
LLOYD V. BLACK
BY
Oscar L. Spencer
ATTORNEY.

INVENTOR.
LLOYD V. BLACK
BY
Oscar L. Spencer
ATTORNEY.

United States Patent Office 2,921,411
Patented Jan. 19, 1960

2,921,411

APPARATUS FOR THE AIR CHILLING OF BENT GLASS

Lloyd V. Black, Tarentum, Pa., assignor to Pittsburgh Plate Glass Company, Allegheny County, Pa., a corporation of Pennsylvania Original application July 27, 1951, Serial No. 238,943, now Patent No. 2,736,140, dated February 28, 1956. Divided and this application September 20, 1954, Serial No. 459,748

5 Claims. (Cl. 49—45)

The present application is a division of my application Serial No. 238,943 for "Method and Apparatus for Treating Sheet Glass," filed July 27, 1951. The earlier application has matured into U.S. Patent No. 2,736,140 on February 28, 1956. This invention relates to apparatus for tempering sheet glass.

One object of the invention is to provide improved apparatus by which sheet glass units can be bent during the course of its transportation along a horizontal conveyor system and in such relation that the bent glass can be subjected to chilling air jets while it still remains heated to softening temperature.

Another object of the invention is to provide an improved structure and arrangement of air blowing apparatus adapted to chill sheet glass units bent into special shapes, such as those presenting sharp curvatures.

In bending sheet glass wherein the end portions of glass units, such as those employed in motor vehicles, are to be bent along relatively sharp localized curvatures, difficulty has been experienced in devising molds and other apparatus suitable for producing such localized curvatures in the sheet glass units. Examples of such sharply bent glass units are found in vehicles in the form of rear windows, known as back lights, or in the form of windshields, and/or in other types of windows.

Each mold frame with a sheet glass unit mounted thereon is transported into a furnace which is heated to proper temperature incidental to the softening of glass, for example, to approximately 1050° F. This furnace is equipped with facilities to apply localized heat at higher temperatures. Electric heating elements can be employed for this purpose so as to direct heat by radiation and in concentrated form to localized areas adjacent the end portions of the sheet glass unit where the sharper bending is to be effected. The concentrated and localized heat is applied at such value as to rapidly increase the temperature in selected areas of the glass unit from approximately 1050° F. to 1200° F. The glass is then immediately bent to the shape of the mold without producing an appreciable transverse curvature, either at the end portions or at the intermediate portions between the sharply bent portions. The concentrated and localized heat is applied only until the glass unit assumes the proper shape. Forces are applied to end portions of the sheet glass unit as a result of peculiarities in the structure and action of the glass supporting mold frame. These forces cooperate with the conveyor system and with the concentrated localized heat to accomplish optimum bending with proper proportions of heat and applied bending forces. The conveyor is operated immediately upon completion of the bending action to transport the glass to a position between upper and lower groups of air jet producing blowers so designed as to apply the air jets at approximately right angles to tangents to the glass curvature substantially at the points of impact of the jets against the glass surfaces.

The conveyor can be so designed and timed in its operation that each glass supporting mold can be transported between these groups of jet blowers at which time the conveyor rolls supporting the mold frame can be stopped for a measured time interval sufficiently long to permit application of chilling air jets upon the surfaces of the glass. The air jet producing unit oscillates upon eccentric mountings so as to describe a closed or endless path for each jet.

The glass supporting mold it held in proper position between the groups of oscillating jets until the glass becomes case hardened or tempered. Then the conveyor mechanism is operated to move the glass supporting mold forward a predetermined distance to bring it between groups of jet producing nozzles in a cooling unit which merely operates to reduce the temperature of the glass which still retains considerable heat although it had been reduced below the critical annealing temperature by the tempering apparatus. Two or more of these cooling units, which are stationary as distinguished from the oscillatable tempering units, can be disposed along the conveyor system at uniformly spaced intervals beyond the oscillating or tempering unit.

After the glass supporting molds reach the tempering unit the remainder of the conveyor system is operated step by step. For example, when one mold is moved to a position between the upper and lower tempering jets, the next mold which has just preceded it is moved to the first stationary cooling unit. Successive glass supporting molds are thus located at the same time between groups of jets of the oscillating unit, and between the groups of jets of the two stationary cooling units. Each sheet glass unit, therefore, is first subjected to a chilling or tempering treatment, and then to two treatments of cooling air from the two stationary jet producing units in connection with the successive steps of operation of the conveyor system. After the last cooling operation each glass supporting mold is removed or transferred to another conveyor and disposed of as desired.

Figure 4:
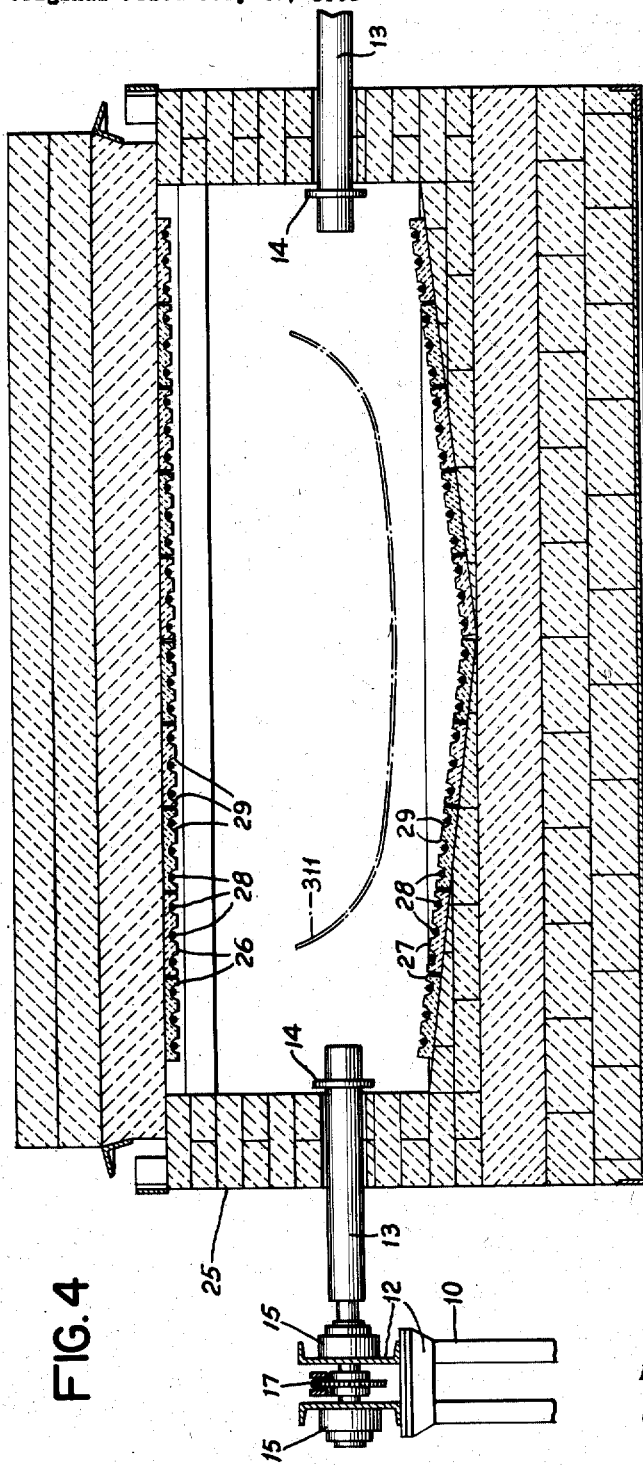
Figure 5:
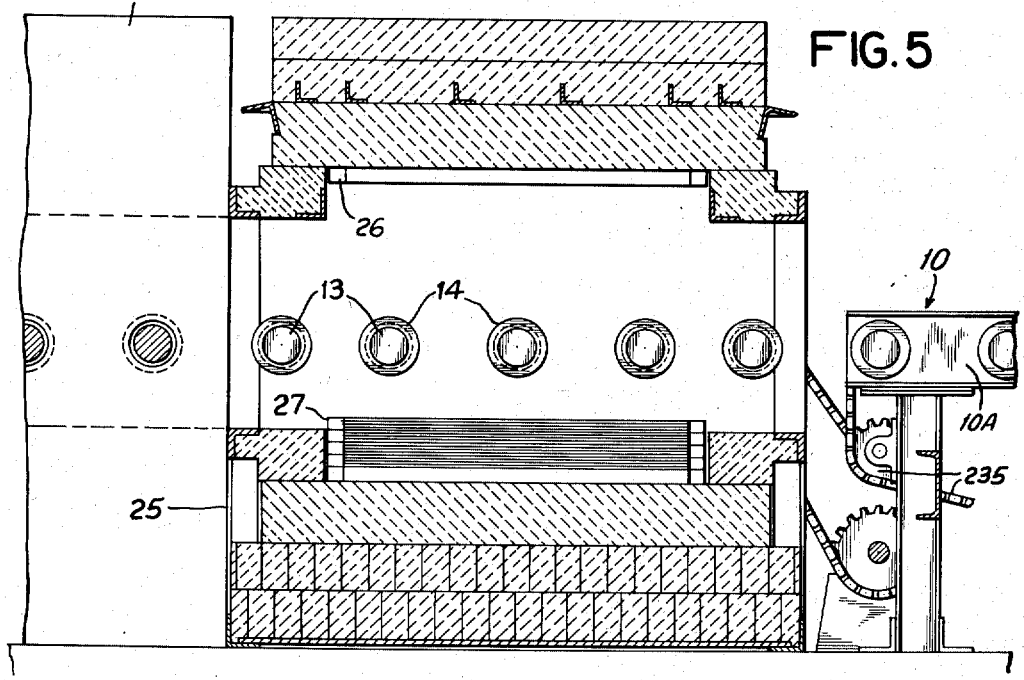
Figure 6:
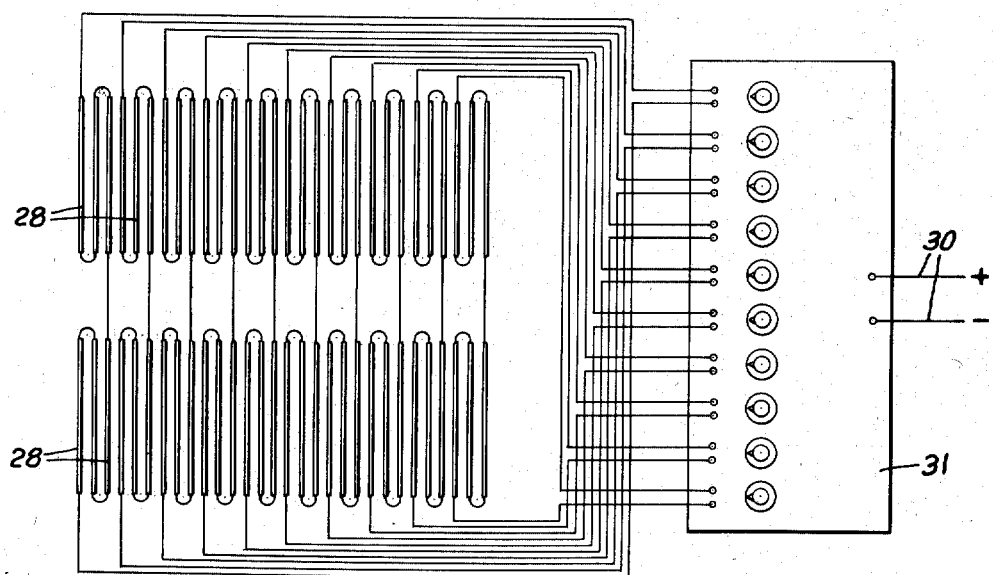
Figure 15:
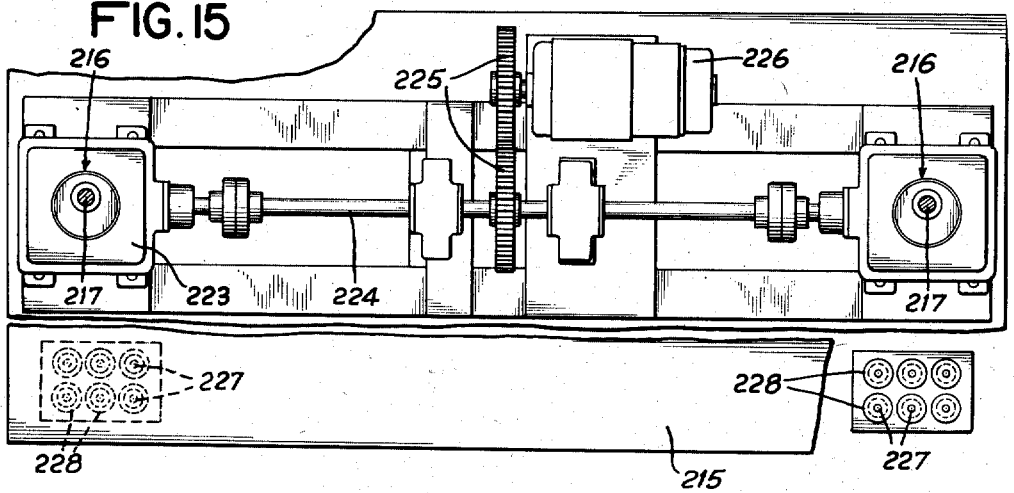
Figure 18:
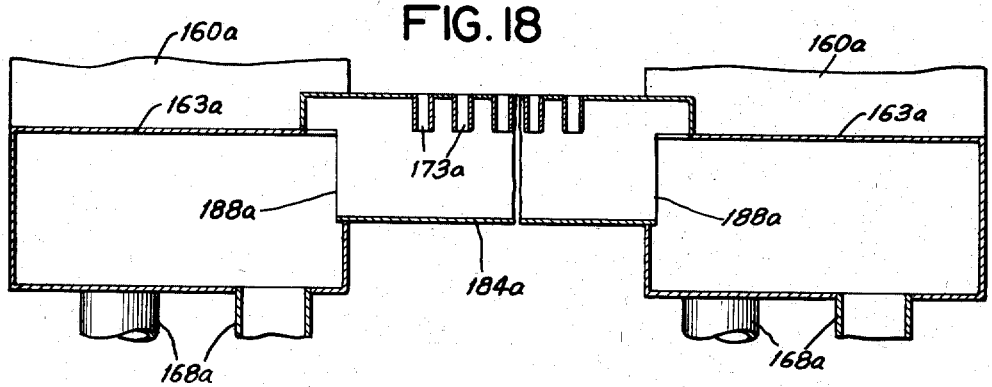
Figure 17:
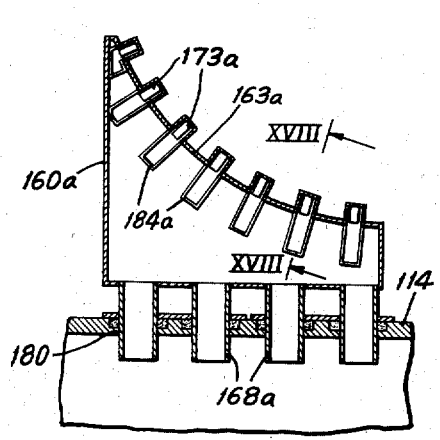
Figure 16:
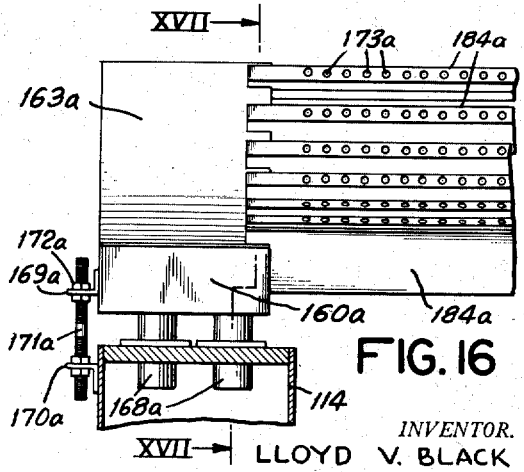

In the drawing:

Fig. 1 is a fragmentary plan of an apparatus for treating glass in bending and tempering operations; Fig. 2 is a fragmentary side elevation of the structure shown in Fig. 1; Fig. 3 is a vertical section of a roll conveyor system taken substantially along the line III—III of Fig. 1; Fig. 4 is a fragmentary vertical section on a larger scale, taken substantially along the line IV—IV of Fig. 1; Fig. 5 is a fragmentary vertical section on a larger scale taken substantially along the line V—V of Fig. 1; Fig. 6 illustrates a wiring diagram and indicates electric control elements for localized heating of portions of a furnace; Fig. 7 is a side elevation of portions of an oscillatable tempering apparatus and including a transverse vertical section taken along the line VII—VII of Fig. 1; Fig. 8 is a fragmentary vertical section on a larger scale, taken substantially along the line VIII—VIII of Fig. 1; Fig. 9 is a fragmentary vertical section on a larger scale, taken substantially along the line IX—IX of Fig. 7; Fig. 10 is a fragmentary plan, illustrating an arrangement of a lower tier of jet tubes; Fig. 11 is a fragmentary vertical section on a larger scale, illustrating an angular nozzle arrangement of one of the jet tubes shown in Fig. 10; Fig. 12 is a fragmentary side elevation of the structure shown in Fig. 11; Fig. 13 is a fragmentary vertical section illustrating a nozzle arrangement to which angular auxiliary nozzles can be attached; Fig. 14 is a fragmentary vertical section taken substantially along the line XIV—XIV of Fig. 7; Fig. 15 is a horizontal section taken substantially along the line XV—XV of Fig. 2 to illustrate partially in plan a power mechanism for oscillatably driving a tempering apparatus; Fig. 16 is a fragmentary view partially in vertical section and partially in elevation of an alternate arrangement of jet directing members; Fig. 17 is a vertical section taken substantially along the line XVII—XVII of Fig. 16; Fig.

18 is a fragmentary vertical section taken substantially along the line XVIII—XVIII of Fig. 17.

Referring to the drawing, there is provided a conveyor system 10 including a supporting frame structure 12 along which the operations of heating, bending and tempering are accomplished. Stub rolls 13 having annular guide flanges 14 thereon are rotatably mounted in bearings 15 formed in the conveyor frame structure. These rolls are mounted in two rows with their axes disposed horizontally in substantially a common plane. Rolls on opposite sides of the frame are axially aligned and spaced so as to leave an open space between and below the rows of rolls.

Suitable driving mechanism including a driven shaft 16 and a sprocket and chain transmission gearing 17 rotates the rolls 13 in the same direction at predetermined peripheral speed. The conveyor system extends into a lehr or furnace 20 which is heated in a conventional manner so as to insure uniformly increased temperatures of values sufficiently high to soften glass. An example of this general type of furnace or lehr, but with a different structure of conveyor rolls is disclosed in U.S. Patent No. 1,638,769.

At the forward end of the furnace 20 an electric heating section 25 is provided. Upper and lower inner walls of this furnace section are provided with refractory channel members 26 and 27 which are disposed linearly with respect to the lengthwise disposition of the conveyor. Electric heating elements 28 are mounted in channels 29 of the upper and lower refractory wall portions 26 and 27. A source of electric energy in main lines 30 is connected to the electric heating elements 28 to supply localized heat energy thereto. Electric control mechanism 31 supplied with power from the main lines 30 is connected to the electric heating elements in such manner that selective groups of the linear heating elements direct localized heat to predetermined areas.

At a location slightly beyond the position of the electric heating section 25 in the forward end of the furnace a jet-projecting tempering apparatus 100 is installed for supplying jets of air upon the surfaces of glass which is to be tempered. A suitable motor 101 drives a pressure-producing blower mechanism 102 which is provided with air conduits 103 and 104 mounted upon stationary supporting framework 105 of the tempering apparatus. One of these conduits 103 is provided with forked portions 106 which in turn, receive upper ends of flexible conduit sections 108 secured thereto. The lower ends of the flexible sections communicate with spaced upper air boxes 110 horizontally disposed in substantially parallel relation. The ends of these boxes opposite the flexible conduit connections 108 are closed. Opposite ends of each flexible conduit section 108 are connected, as indicated at 111, to the conduit sections 106 and to the upper air boxes 110.

Likewise, the other conduit 104 is formed with forked portions 112 to which flexible conduit sections 113 are connected at the upper ends of the latter. The lower ends of these flexible connections communicate with two spaced lower air boxes 114 disposed in substantially parallel horizontal relation. The ends of the lower air boxes opposite the flexible sections 113 are closed and the latter are mounted in the same manner as the sections 108. The upper and lower air boxes 110 and 114 are vertically spaced in substantially parallel symmetrical relation. These upper and lower air boxes are rigidly mounted, as indicated at 115, upon intermediate frame structure 116 which is movable with respect to the stationary mounting of the blower 102 and conduits 103—104. The flexible sections 108 and 113 permit relative movement between these elements while maintaining proper air communication to the boxes 110 and 114. Suitable baffles 117 and 117a can be included in one end portion of each of the upper and lower boxes 110 and 114, respectively, to facilitate change in direction of air passing from the vertical conduits into the horizontally disposed boxes.

A series of staggered openings 119 defining rabbeted recesses 120 are formed in the lower walls of the upper air boxes to receive legs 121 of substantially U-shaped jet tubes 123 each of which is formed with a hollow horizontal body portion 124. These tubes are arranged in side by side relation and span the distance between the two spaced upper air boxes 110 transversely of the latter. Each tube includes two of the upwardly disposed tubular legs 121 which are slidably adjustable in corresponding symmetrical openings 119 of the air boxes 110. Suitable packing bushings 125 surround the tubular legs in closely fitting relation to provide a substantial seal against the escape of air under pressure that is supplied to the tubes by the blower 102. These packing or sealing bushings 125 are composed of resilient yieldable material treated so as to have an oily character and are disposed in the recesses 120. Flat closures 126 of perforated plate material receive the legs 121 therethrough and confine the packing bushings in the recesses 120. Suitable fastening devices 127 secure the plate closures 126 to the bottoms of the upper boxes 110.

An intermediate portion of each air tube 123 (Fig. 9) is provided with an adjusting rod 128 having its lower end rigidly secured thereto, as indicated at 129. Each rod extends upwardly parallel to the tubular legs 121 through an opening 130 in a channel element 131 of the frame structure 116 and is also slidable in a guiding sleeve 132 that is rigidly mounted in an angle iron 134 of the frame structure at a location vertically spaced from the opening 130.

A bevel gear 135 that is axially screwthreaded upon the rod 128 is formed with a peripheral groove 136 in which a keeper 137 of plate form is engaged and the keeper is spaced from the adjacent surface of the angle iron by means of a plate 138. Thus the gear 135 can rotate but is held by the keeper against axial movement. Suitable fastening means 139 rigidly clamps the keeper and plate 138 to the angle iron 134. A second bevel gear 140 meshing with the gear 135 and having its axis disposed at right angles to the axis of the bevel gear 135 is rigidly mounted upon one end of a rod 141 which extends horizontally and rotatably through an opening 142 in the angle iron 134. This rod extends laterally to the side of the frame where it is disposed rotatably through an opening 143 in a frame structure element 144. The outer end of the rod is squared, as indicated at 145, to receive a tool, such as a wrench, by the operation of which the rod is rotatable. By this manipulation or rotation of the rods 128 and 141, the jet tube 123 can be adjusted vertically as the rod 128 slides through the opening 130 and sleeve 132. All of the jet tubes are provided with adjusting mechanisms of this kind so that each of such tubes can be adjusted independently in vertical directions.

Each of these jet tubes 123 is provided with a series of nozzles 150 mounted rigidly, as indicated at 151, in the lower wall thereof. These nozzles extend upwardly and inwardly into the jet tube and their outer ends are thus substantially flush with the lower outer surface of the tube wall. Also these nozzles are aligned in a row lengthwise of the jet tube, although it is not necessary that such nozzles be in absolute alignment.

In addition to the jet tubes which comprise the central area of the upper jet producing unit, the two upper air boxes are provided with end sections in the form of jet boxes 160 which are symmetrical in arrangement and structure and their individual parts correspond substantially identically. Each of these end section boxes includes a vertical wall 162 adjacent and flanking the group of central air jet tubes 123. Each section 160 also includes an upwardly extending curved wall 163 which can be substantially in the form of a section of a cylinder. Each box section 160 also includes an outward hollow extension 164 above the curved wall and the entire box is so constructed that its upper wall 165 is disposed substantially horizontally. Tubes 168 (Fig. 14) are secured rigidly, for example by welding, in the upper horizontal wall 165 for communication with the interior of the box. These tubes also are slidable in certain of the openings 119 adjacent the end portions of the upper air boxes 110 in the same manner as the tubular legs 121 of each jet tube are slidably mounted in the upper air boxes. They are thus in proper communication with the conduit 103 to receive air under pressure therefrom.

Upper and lower brackets 169 and 170 are mounted upon the sides of the end section boxes and upon a portion of the framework 116 of the tempering apparatus. Pairs of these brackets are vertically aligned to receive bolts 171 upon which pairs of adjusting nuts 172 are screw-threaded for the purpose of elevating or lowering these end sections. By such means the ends sections can be vertically adjusted and can also be adjusted to a certain degree in angular or tilting relations if desired because the bolts 171 extend relatively loosely through the brackets before the nuts are tightened thereon. If desired the brackets 169 and 170 can be slotted to provide adjustment of these end sections toward and away from the central air tubes 123.

Rows of nozzles 173 project radially from the curved cylindrical wall 163 of each end section 160 and are rigidly secured thereto, as indicated at 174, in such manner as to insure air communication from the air boxes and further to insure outward and radial discharge of the air from the nozzles.

A series of staggered openings 180 so formed as to include rabbeted recesses 181 are disposed along the upwardly facing wall 182 of each lower air box 114 to receive downwardly disposed legs 183 of substantially U-shaped jet tubes 184 similar to the tubes 123 described above. Each tube includes a horizontal hollow portion 185. These tubes 184 are arranged in side by side relation and span the distance between the lower air boxes 114 transversely thereof. Each air tube includes two of the integral downwardly extending tubular legs which are slidable in corresponding symmetrical openings 180 of the air boxes. Suitable packing or sealing bushings 186 surround the tubular legs in closely fitting relation in the recesses 181 to provide a substantial seal against the escape of air supplied to the tubes. These packing bushings 186 are composed of yieldable resilient material treated so as to have an oily character. Flat closure 187 composed of perforated plate material confine the packing bushings in the recesses and are secured to the walls of the air boxes as indicated at 189.

Adjusting rods 190 and 191 disposed at right angles to each other are mounted in connection with each of the lower tubes 184 in the same manner as the upper rods 128 and 141 are mounted with respect to the tubes 123. These rods 190 and 191 rotate in frame members 192, 193, and 194 corresponding substantially to the frame members 131, 134, and 144, respectively, as described above, and are provided with bevel gears 195 and 196 installed in the same manner as and corresponding to the bevel gears 135 and 140, respectively. A suitable tool such as a wrench can be applied upon the squared end portion 197 of each rod 191 to adjust the tube associated therewith.

It is to be noted that several of the air tubes adjacent opposite extremities of the lower air box 114 are inclined upwardly and inwardly so that the inclined tubes at opposite extremities are disposed upwardly in converging relation. This inclination is particularly noticeable in the position of the tube legs 183 although the body portion 185 of each tube remains substantially horizontal transversely of the air boxes, but with the upper walls and nozzles tilted. These inclined tubes are substantially the same in construction as the intermediate tubes except for certain details to be explained as the description proceeds.

End portions of the lower air boxes are provided with inclined upper wall sections 200 sloping in opposite directions to receive the inclined air jet tubes 184 in the openings 180 which extend to this section of the air box structure. In order to save space and facilitate the mounting of the rods 190 and 191 of the adjusting mechanisms that are connected to the jet tubes on the inclined sections 200, the horizontal adjusting rods 191 at these sections extend through the walls of the lower air box 114. Suitable bushings 201 in these walls through which the rods extend and rotate provide a substantial air seal while permitting free rotation of the rods therein. Thus the rods extending through the walls of the lower air box are conveniently accessible for manipulation when it becomes desirable to adjust the inclined air jet tubes. If desired, plates 202 mounted flush upon the wall of the air box at the location of the rods 191 can be employed to receive and facilitate the mounting of the bushings 201 adjacent the end portions of the individual air box 114, through which the rods extend. Each plate 202 can be welded or otherwise rigidly secured to the air box.

Each of the jet tubes 184 is provided with a series of nozzles 203 mounted rigidly, as indicated at 204, in the upper wall thereof, in substantially the same manner as the inwardly projecting nozzles 150 are mounted as above described with reference to the structure of the upper air tubes 123.

Each of these jet tubes 184 at the end sections, especially at the inclined jet tubes, are adapted to receiver nozzle bars 205 (Figs. 11 and 12) having jet openings 206 registering with the nozzles 203, but extending angularly therefrom. Each nozzle bar 205 lies flat upon the upper wall face of the jet tube with which it cooperates and is provided with a sealing gasket 208 of resilient material having openings 209 therethrough registering with the nozzles. Each nozzle bar is secured in clamped relation to the jet tube with the gasket 208 therebetween. Suitable fastening devices 210 of conventional form are included to effect this clamped construction. The end nozzle bars 205 are spaced from opposed nozzles 173 in the end sections 160 of the upper jet producing structure. It is to be understood that the angularity of the jet openings in the nozzle bars 205 can be progressively varied from 90° from bar to bar so as to direct the jets of air in such relation as desired about given curvatures. Also it is to be understood that the nozzle bars can be omitted at the central portion of the unit.

The spaced upper and lower jet producing nozzle arrangements as described above define an area 211 of relatively slight curvature along its intermediate portion, whereas the areas 212 adjacent opposite extremities thereof define very sharp curvatures. Jets of air from the upper nozzles 173 and jets from the lower nozzles 203 are substantially radially directed about the end portions of the curved space defined as above described.

Interchangeable nozzle bars having nozzle openings of various degrees of inclination can be substituted for those described in order to adjust the jets of air at desired angles about curvatures which may vary with different types of work to be treated.

The frame structure 116 which carries the upper and lower air boxes and their accompanying air jet tubes includes a lower substantially horizontal rectangular platform 215. Eccentric mountings 216 are provided at the corner portions of the platform adjacent one marginal portion thereof. Each of these eccentric mountings includes an upper vertical shaft 217 rotatable in a bearing 218 carried by the platform, and a second vertical shaft 219 is eccentrically mounted with respect to the first shaft 217 by means of crank disks 220 that are secured together rigidly as indicated at 221.

The lower vertical shafts are driven through conventional reduction gearings, indicated at 223, from opposite ends of a horizontal shaft 224 which is in turn driven through intermediate transmission gearing 225 connected to an electric motor 226. Marginal portions of the platform opposite the eccentric mountings rest upon hardened metal balls 227 mounted in supports 228 so as to facilitate oscillating motion imparted to the platform through the eccentric mountings. Any point upon the movable structure carried by the eccentric mountings thus describes a complete circle in a horizontal plane. This circle is of limited magnitude and it has been found that a circle somewhat less than two inches in diameter produces satisfactory results. Each jet opening designated above therefore describes a similar circle during the oscillation of the unit and adjacent circles described by these jet openings overlap one another.

The mechanisms for actuating the eccentric mountings 216, including the transmission 223, motor 226, and ball supports 228, are carried upon conventional supporting means 229 which also carries the stationary installations of the blower apparatus.

As shown in Figs. 1 to 3, additional jet distributing units 100A and 100B are installed in spaced relation along the path of the conveyor 10 for cooling purposes after the work has been subjected to tempering operations in the unit 100. The units 100A and 100B include blowers 102A and 102B operable in the same manner as the blower 102 by means of motors 101A and 101B, respectively. These two additional units 100A and 100B are constructed in the same manner as the unit 100, with the exception that the features of the unit 100 involving the oscillatory motion thereof are omitted and therefore, the strucures of the units 100A and 100B are sationary.

The conveyor system 10 extends beyond the units 100, 100A and 100B and includes a section 10A adapted to transport work away from the furnace section 25 to and beyond these units. The section 10A is operated by means of a suitable motor driven unit 230 (Fig. 1) including a motor 231, reduction gearing 232, transmission gearing 234 connected through sprocket and chain gearing 235 to rotate the stub rolls 13 in the section 10A.

Under certain conditions, it may be desirable to include in the group of lower air jet tubes, a pair of end sections 160A somewhat similar to the upper end sections 160. However, it will be observed that instead of the convex form of the cylindrical wall 163, each lower section 160A is formed with a substantially cylindrical concave wall 163A in which jet tubes 184A are disposed radially in edgewise relation and welded in the wall 163A. Radial nozzles 173A are rigidly mounted in the tubes 184A so as to be directed toward the sharply curved end portions of the space defined between the upper and lower sets of nozzles. Tubes 168A of each section 160A are adapted to fit slidably in certain of the openings 180 of each lower air box 114 in the same manner as the tubes 168 fit into the openings 119 of the upper boxes 110. Upper and lower brackets 169A and 170A, together with bolts 171A and nuts 172A, also operate in substantially the same manner as the brackets 169 and 170, bolts 171 and nuts 172, respectively, as described above. Rows of the nozzles 173A project radially from the wall 163A, but in inverse relation to the oppositely arranged nozzles 173 and 163, respectively. Portions of the air tubes 184A are cut away, as indicated at 188A, to permit free passage of air therethrough to the nozzles 173A. It will therefore be apparent that the lower end sections 160A are mounted and operate in substantially the same manner as the upper end sections 160, and that further description of the lower end sections is not required for a proper understanding of the disclosure involved.

Several glass supporting frame units 305 are mounted in spaced relation with their opposite extremities carried upon the stub rolls 13 for transportation along the conveyor system.

In a practical application of the invention each mold frame carries a sheet glass unit 311 which is so mounted and supported upon the mold frame as to facilitate operations of bending and tempering to which such glass is to be subjected in connection with treatment thereof in the furnace 20.

As soon as the bending operation has been completed the frame unit with the glass sheet thereon is moved to a position between the upper and lower jet tubes 123 and 184. Providing a stub roll conveyor in this region permits extensive adjustment of the jet tubes to produce spaces conforming to widespread variations in glass curvatures including exceedingly deep bends having central portions located below the support level defined by the stub rolls of the conveyor. It is of course to be understood that the nozzles 173 of the end section boxes 160 are included to operate with the upper jet tubes 123. While the glass is still heated to softening temperature, the jet directing nozzles apply jets of air upon opposite sides of the glass sheet and during this application the unit 100 is oscillated in the manner described above. At the curved end portions of the glass, it is to be noted that the nozzles are directed toward the curvature of the glass in such manner as to strike the glass surface substantially at right angles to tangents to the curvatures at points on the glass surface nearest the discharge of the individual nozzles. In this way the most advantageous tempering effect can be realized from the air jets.

After the tempering operation, the glass still retains considerable heat below annealing temperatures which can be dissipated in the operation of the succeeding units 100A and 100B. The temperature in the glass is thus reduced to a value sufficiently low to permit handling thereof without inconvenience.

Although considerable structural arrangements involving the invention have been shown and described in detail, it will be apparent to those skilled in the art that the invention is not so limited but that various changes can be made therein without departing from the spirit and/or scope of the invention as exemplified in the appended claims.

I claim:

1. In a glass tempering apparatus, a pair of spaced substantially parallel upper air boxes having openings facing downwardly, a pair of spaced susbtantially parallel lower air boxes disposed below the upper air boxes in symmetrical relation thereto, an upper group of jet tubes having therein air jet nozzles facing downwardly and having upwardly disposed tubular legs vertically adjustable in a plurality of the downwardly facing openings of the upper air boxes, said jet tubes spanning the space between the upper air boxes, a lower group of tubes having therein air jet nozzles facing upwardly and having downwardly disposed tubular legs vertically adjustable in a plurality of the upwardly facing openings of the lower air boxes, said group of lower tubes spanning the space between the lower air boxes, auxiliary nozzle boxes adjacent opposite sides of at least one group of the tubes, each nozzle box spanning the distance between the air boxes adjacent which it is mounted and having vertically adjustable tubular portions extending into openings in said air boxes, each nozzle box having a curved wall portion and having rows of jet nozzles disposed along said curved wall portion in communication with the interior of the nozzle boxes, said rows of jet nozzles fanning outwardly from the group of nozzles of the adjacent jet tubes, means for supporting and oscillating the groups of jet tubes and nozzle boxes as a unit, and means for supplying air under pressure to said jet tubes and nozzle boxes.

2. In a tempering apparatus, a pair of spaced upper air boxes having conduit connections for receiving air under pressure, a series of upper air jet tubes spanning the distance between the air boxes and having tubular legs extending slidably into the lower walls of the upper air boxes for communication therewith, means for adjustably maintaining the legs in the walls of the boxes, a pair of spaced lower air boxes having conduit connections for receiving air under pressure, a series of lower air jet tubes, each lower tube spanning the distance between the lower air boxes and having tubular legs extending slidably into the upper walls of the lower air boxes for communication with the interior thereof, means for adjustably maintaining the legs of the lower jet tubes in the upper walls of the lower air boxes, each jet tube having a row of openings therein, a series of bars having jet openings therethrough registering with respective rows of jet openings of the jet tubes at angles to the latter, and means for securing the bars to the jet tubes.

3. In a tempering apparatus, a pair of spaced upper air boxes having conduit connections for receiving air under pressure, a series of upper air jet tubes spanning the distance between the air boxes and having tubular legs extending slidably into the lower walls of the upper air boxes for communication therewith, means for adjustably maintaining the legs in the walls of the boxes, a pair of spaced lower air boxes having conduit connections for receiving air under pressure, a series of lower air jet tubes, each lower tube spanning the distance between the lower air boxes and having tubular legs extending slidably into the upper walls of the lower air boxes for communication with the interior thereof, means for adjustably maintaining the legs of the lower jet tubes in the upper walls of the lower air boxes, each jet tube having a row of openings therein, a series of bars secured to the jet tubes and having jet openings registering with the openings in the jet tubes at angles to the latter, and auxiliary air jet boxes disposed in flanking relation at opposite extremities of the upper jet tubes and having a series of jet openings directed outwardly and radially therefrom.

4. In apparatus for tempering a glass sheet bent along its length into a non-uniform curvature including a gently bent region flanked by sharply curved regions comprising means for supporting a glass sheet so shaped in a horizontally disposed position; a first set of upper nozzle members with air jet openings therein, each upper nozzle member extending horizontally above said position; a second set of lower nozzle members with air jet openings therein spaced below said first set of upper nozzle members, each lower nozzle member extending horizontally below said position; said sets of nozzle members defining therebetween a curved space conforming to the longitudinal shape of the glass sheet to be bent; each nozzle member comprising a plurality of substantially equally spaced nozzles; each nozzle being directed substantially normally toward a portion of the curved space; the nozzles comprising the upper nozzle members terminating in bottom jet openings defining points in an upper curved surface spaced substantially equal distances above corresponding points of said horizontally disposed position; the nozzles comprising the lower nozzle members terminating in upper jet openings defining points in a lower curved surface spaced substantially equal distances below corresponding points of said horizontally disposed position; nozzle boxes having outer convex wall portions facing said sharply curved regions and flanking one of said series of nozzle members, said wall portions having jet openings disposed substantially normally therethrough to terminate outwardly of said outer convex wall portions in extensions of the curved surface formed by said one of said series of nozzle members; means for adjustably mounting said nozzle members and nozzle boxes independently of each other on the support to equalize the distances separating said upper and lower curved surfaces from said horizontally disposed position; the jet openings in the upper curved surface being spaced substantially equally from adjacent jet openings of said upper curved surface and the jet openings in the lower curved surface being spaced substantially equally from adjacent jet openings of said lower curved surface; means for supplying fluid under pressure through said jet openings; and means operatively connected to said nozzle member set supporting means for moving said nozzle members in a circular path so that the paths traversed by the fluid blasts from adjacent jet openings overlap each other at said horizontally disposed position.

5. The improvement according to claim 4, wherein said nozzle boxes flank said first set of upper nozzle members.

References Cited in the file of this patent

UNITED STATES PATENTS

| 607,777 | Tresidder | July 19, 1898 |
| 1,791,404 | Fahrenwald | Feb. 3, 1931 |
| 1,840,661 | Fahrenwald | Jan. 12, 1932 |
| 2,015,211 | Wood | Sept. 24, 1935 |
| 2,251,159 | Owen | July 29, 1941 |
| 2,254,227 | Lewis | Sept. 2, 1941 |
| 2,608,029 | Glynn | Aug. 26, 1952 |
| 2,646,647 | Bamford et al. | July 28, 1953 |
| 2,677,918 | Bird et al. | May 11, 1954 |
| 2,680,936 | Grotefeld | June 15, 1954 |

FOREIGN PATENTS

| 463,051 | Great Britain | Mar. 19, 1937 |

UNITED STATES PATENT OFFICE

CERTIFICATE OF CORRECTION

Patent No. 2,921,411 January 19, 1960

Lloyd V. Black

It is hereby certified that error appears in the printed specification of the above numbered patent requiring correction and that the said Letters Patent should read as corrected below.

Column 7, line 16, for "transmission" read -- transmissions --; line 32, for "sationary" read -- stationary --.

Signed and sealed this 15th day of November 1960.

(SEAL)
Attest:

KARL H. AXLINE
Attesting Officer

ROBERT C. WATSON
Commissioner of Patents